(12) United States Patent
Nishi

(10) Patent No.: US 6,833,870 B1
(45) Date of Patent: Dec. 21, 2004

(54) CHARGE TRANSFER DEVICE AND SOLID-STATE IMAGE PICKUP DEVICE

(75) Inventor: Naoki Nishi, Kanagawa (JP)

(73) Assignee: Sony Corporation, Tokyo (JP)

( * ) Notice: Subject to any disclaimer, the term of this patent is extended or adjusted under 35 U.S.C. 154(b) by 710 days.

(21) Appl. No.: 09/621,651

(22) Filed: Jul. 21, 2000

(30) Foreign Application Priority Data

Jul. 28, 1999 (JP) .......................................... P11-213247

(51) Int. Cl.[7] .............................................. H04N 3/14
(52) U.S. Cl. ...................................... 348/294; 348/316
(58) Field of Search ................................. 348/316, 311, 348/312, 313, 314, 321, 322; 250/208.1; 257/224, 240

(56) References Cited

U.S. PATENT DOCUMENTS

| | | | | |
|---|---|---|---|---|
| 4,158,209 A | * | 6/1979 | Levine ........................ | 257/240 |
| 4,731,656 A | * | 3/1988 | Dischert et al. ............. | 257/240 |
| 5,103,278 A | * | 4/1992 | Miwanda ..................... | 257/240 |
| 5,239,192 A | * | 8/1993 | Hirota ......................... | 257/240 |
| 5,401,679 A | * | 3/1995 | Fukusho ..................... | 438/144 |
| 5,521,405 A | * | 5/1996 | Nakashiba .................. | 257/224 |
| 6,417,531 B1 | * | 7/2002 | Nakashiba .................. | 257/240 |
| 6,510,193 B1 | * | 1/2003 | Kochi et al. ................ | 257/240 |

* cited by examiner

Primary Examiner—Tuan Ho
Assistant Examiner—Rashawn N Tillery
(74) Attorney, Agent, or Firm—Robert J. Depke; Holland & Knight LLP

(57) ABSTRACT

In a charge transfer device which has many two-layered transfer electrodes, 8L disposed along a charge transfer direction X above a transfer channel is driven with two-phase driving pulses supplied to the transfer electrodes of the second layer, the transfer channel below the last-stage transfer electrode disposed at the last stage of the charge transfer direction X is constructed to have three-step potential, and the potential is set to be stepwise deeper from the upstream side to the downstream side in the charge transfer direction X.

7 Claims, 7 Drawing Sheets

(TRANSFER CHANNEL)

PRIOR ART

CHARGE TRANSFER DEVICE AND SOLID-STATE IMAGE PICKUP DEVICE

BACKGROUND OF THE INVENTION

1. Field of the Invention

The present invention relates to a charge transfer device in which two-phase driving pulses are applied to a number of two-layered transfer electrodes arranged above a transfer channel to perform a transfer operation, and a solid-state image pickup device using the same.

2. Description of the Related Art

Generally, in a solid-state image pickup device such as CCD (Charge Coupled Device) area sensor or the like, signal charges which are photoelectrically converted by a photosensor serving as an image receiving element are transferred in a vertical direction by plural vertical transfer registers, and the signal charge thus transferred by each of the vertical transfer registers is transferred in a horizontal direction by a horizontal transfer register which is driven in two-phase.

FIGS. 5A to 5C show the construction of a horizontal transfer register and an output portion in a conventional solid-state image pickup device (CCD area sensor), wherein FIG. 5A is a cross-sectional view showing the arrangement of electrodes of the horizontal transfer register, FIG. 5B shows the potential distribution corresponding the electrode arrangement, and FIG. 5C is a plan view showing the structure in the neighborhood of the last stage of the horizontal transfer register.

In FIG. 5, a number of two-layered transfer electrodes 51 are arranged along a charge transfer direction X above a transfer channel 50, and a gate electrode 52 is formed so as to be adjacent to a transfer electrode 51L located at the last stage thereof (hereinafter referred to as "last-stage transfer electrode"). Each of the two-layered transfer electrodes 51, 51L is constructed by a transfer electrode 51a, 51La as the first layer and a transfer electrode 51b, 51Lb as the second layer. Further, a two-phase driving pulse øH1, øH2 is applied to the two-layered transfer electrode 51 (containing 51L), and a gate voltage (DC voltage) VHOG is applied to the gate electrode 52.

Besides, in the potential distribution of the transfer channel 50, the potential level corresponding to the transfer electrode 51a, 51La of the first layer is set to be deeper than the potential level corresponding to the transfer electrode 51b, 51Lb of the second layer by doping an area below the transfer electrode 51b, 51Lb of the second layer with such impurities as to shallow the potential level. With the doping of these impurities, in the area of the transfer channel 50, a storage portion (1) is formed below the transfer electrodes 51a, 51La of the first layer and a transfer portion (2) is formed below the transfer electrodes 51b, 51Lb of the second layer.

Further, a floating diffusion area (hereinafter referred to as "FD area") is connected through the gate electrode 52 to the last-stage transfer electrode 51L. The FD area 53 serves to detect the charge amount of signal charges transferred by the last-stage transfer electrode 51L and convert the charges to the voltage corresponding to the charge amount thus detected.

Next, the manufacturing process of the horizontal transfer register in the conventional solid-stage image pickup device will be described with reference to FIGS. 6A to 6D.

First, as shown in FIG. 6A, an N-type transfer channel is formed on a semiconductor substrate, and then the electrodes 51a, 51La of the first layer are formed. Subsequently, as shown in FIG. 6B, a predetermined portion is covered by a resist mask 54, and then P-type impurities to shallow the channel potential are doped by an ion implantation method or the like with the electrodes 5151a, 51La of the first layer as a mask.

Subsequently, as shown in FIG. 6C, the peripheral portions of the electrodes 51a, 51La of the first layer are covered by insulating material by oxidizing the electrodes 51a, 51La of the first layer or the like, and then the electrodes 51b, 51Lb, 52 of the second layer are formed. Finally, as shown in FIG. 6D the electrode 52 at the end position is wired to form a gate electrode. Further, the other electrodes 51a, 51La of the first layer and the electrodes 51b, 51Lb of the second layer which are adjacent to each other are connected to each other to form the transfer electrodes 51, 51L of the second layer.

The maximum operating charge amount in the horizontal transfer register (hereinafter merely referred to as "operating charge amount") increases in proportion to the potential difference between the storage portion (1) and the transfer portion (2) and the electrode length Lst and the channel width W of the storage portion (1). In other words, the operating charge amount of the horizontal transfer register is determined by two parameters of the potential difference between the storage portion (1) and the transfer portion (2) and the electrode area of the storage portion (1) (the effective electrode area corresponding to the channel width).

The FD area 53 is formed of a more minute area than the transfer electrodes 51, 51L in order to increase the charge-to-voltage conversion gain and thus enhance the detection sensitivity. Therefore, the transfer channel 50 of the horizontal transfer register is designed so that the channel width W is reduced from the vicinity of the last-stage transfer electrode 51L to the FD area 53.

In this case, the electrode area of the storage portion of the last-stage transfer electrode 51L is reduced as the channel width W is reduced, so that the operating charge amount is reduced by the amount corresponding to the reduction of the electrode area. Therefore, it may be considered to alter the two parameters in order to prevent the reduction of the operating charge amount. However, with respect to the potential difference between the storage portion (1) and the transfer portion (2), if the potential difference is increased to ensure the operating charge amount, the amplitude at the transfer operation time is increased and thus the consumption power is increased. Therefore, in the present situation, there may be considered a method of increasing the electrode length Lst of the storage portion (1) of the last-stage transfer electrode 51L as shown in FIG. 7 to increase the electrode area at that place and ensure the operating charge amount.

However, if the electrode length Lst of the storage portion (1) of the last-stage transfer electrode 51L is increased as described above, the transfer distance (Lst+Ltr) at the last-stage transfer electrode 51L is also increased by the amount corresponding to the increase of the electrode length Lst, and thus the signal charge is hard to flow and thus the transfer efficiency is lowered. As a result, a transfer failure of the signal charge at the last-stage transfer electrode 51L occurs (the transfer is left uncompleted or the like), and image quality deterioration (color mixture, image tear or the like) occurs.

SUMMARY OF THE INVENTION

The present invention has been made in view of the above circumstances, and provides a charge transfer device which can secure a sufficient operating charge amount without deteriorating the transfer efficiency, and a solid-state image pickup device using the charge transfer device.

According to an aspect of the present invention, there is provided a charge transfer device having a transfer channel and plural pairs of two-layered transfer electrodes arranged along a transfer direction on the transfer channel, wherein two-phase driving pulses are applied to the plural pairs of two-layered transfer electrodes, and the transfer channel below a paired two-layered transfer electrode disposed at the last portion in the transfer direction has a first area, a second area which is provided at the downstream of the first area in the transfer direction and has a deeper potential level than the first area, and a third area which is provided at the downstream of the second area in the transfer direction and has a deeper potential level than the second area.

According to another aspect of the present invention, there is provided a solid-state image pickup device including an image pickup portion which contains plural photosensors and converts input light to electrical signals by the plural photosensors, a transfer channel for transferring the charges thus photoelectrically converted in the image pickup portion, and plural pairs of two-layered transfer electrodes arranged along a transfer direction on the transfer channel, wherein two-phase driving pulses are applied to the plural pairs of two-layered transfer electrodes, and the transfer channel below a paired two-layered transfer electrode below the paired two-layered transfer electrodes disposed at the last portion in the transfer direction has a first area, a second area which is provided at the downstream of the first area in the transfer direction and has a deeper potential level than the first area, and a third area which is provided at the downstream of the second area in the transfer direction and has a deeper potential level than the second area.

According to the charge transfer device thus constructed and the solid-state image pickup device using the charge transfer device, the transfer channel below the last-stage transfer electrode is designed so as to have three or more stages of potential, and also the potential is set so as to be stepwise deeper from the upstream side to the downstream side, so that even when the electrode length of the storage portion of the last-stage transfer electrode is increased, the signal charge flows more easily there due to the increase of the step number of the potential.

BRIEF DESCRIPTION OF THE DRAWINGS

Preferred embodiments of the present invention will be described in detail based on the following figures, wherein.

DETAILED DESCRIPTION OF THE PREFERRED EMBODIMENTS

Preferred embodiments according to the present invention will be described hereunder with reference to the accompanying drawings.

Figure 1:
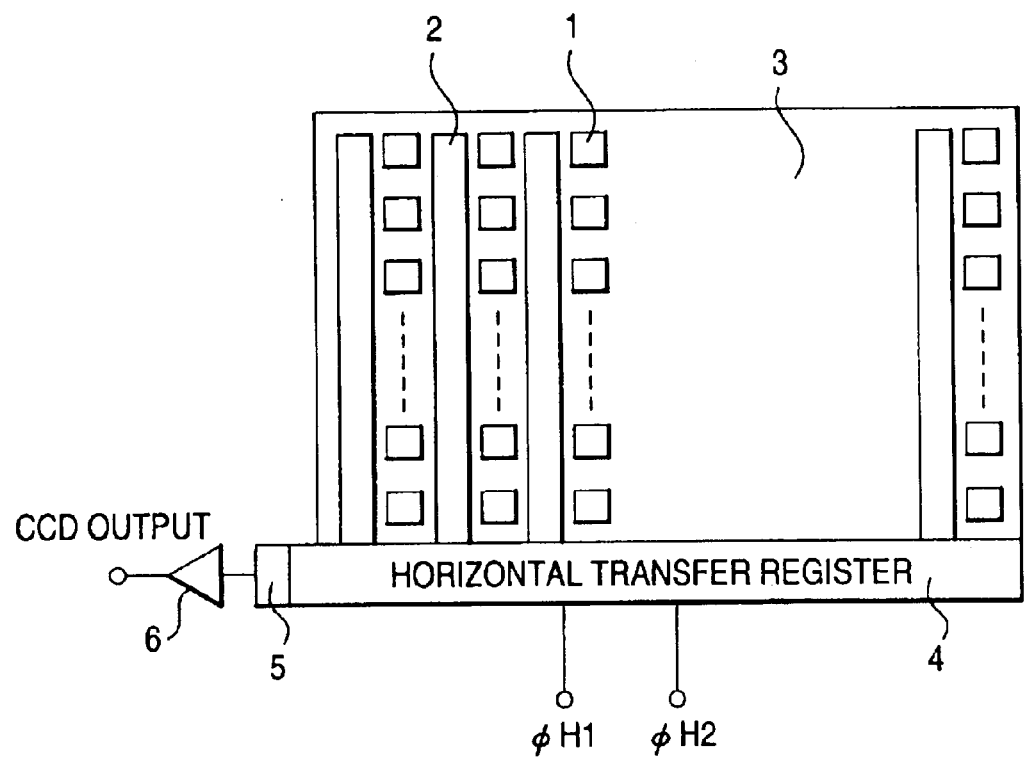
FIG. 1 is a diagram showing the construction of a CCD area sensor to which the present invention is applied.

FIG. 1 is a diagram showing the construction of a CCD area sensor.

In FIG. 1, an image pickup portion 3 is constructed by many photosensors 1 and plural vertical transfer registers 2. The respective photosensors 1 are two-dimensionally arranged in the horizontal direction (the right-and-left direction in FIG. 1) and the vertical direction (the up-and-down direction in FIG. 1), and each photosensor 1 serves to convert incident light thereto to the signal charge having the charge amount corresponding to the light amount of the incident light and store the signal charge. Each vertical transfer register 2 is provided every vertical array of the photosensors 1, and it serves to vertically transfer the signal charge read out from each photosensor 1.

In the image pickup portion 3, the signal charges obtained through the photoelectric conversion in the photosensors 1 are instantaneously read out to the vertical transfer registers during a part of a vertical blanking period. The vertical transfer registers 2 are driven, for example at four phases to transfer the signal charges read out from the photosensors 1 to the horizontal transfer register 4 during a part of a horizontal blanking period. The horizontal transfer register 4 is designed as a two-phase driving type which is driven on the basis of two-phase driving pulses φH1, φH2.

A charge detector 5 which is designed as a floating diffusion amplifier type is provided at the rear stage of the horizontal transfer register 4. The charge detector 5 detects the signal charge transferred from the horizontal transfer register 4 and converts the signal charge to the signal voltage. The signal voltage thus converted is read out as CCD output through the output amplifier 6.

Figure 2A:
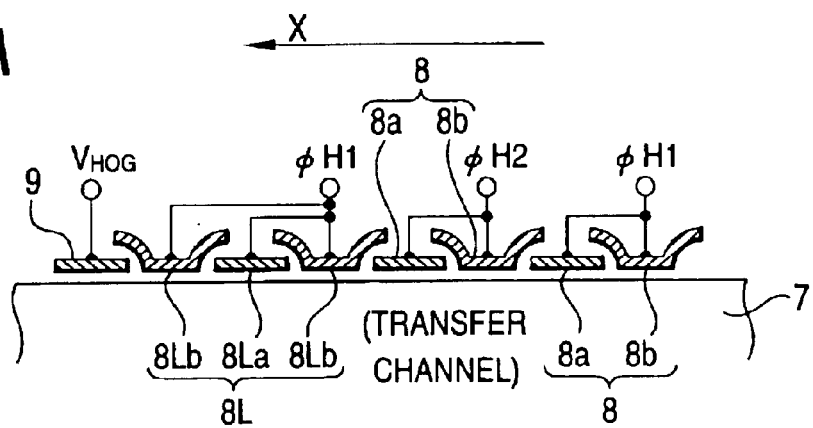
FIG. 2 is a diagram showing the main part of a horizontal transfer register according to an embodiment of the present invention.
Figure 2B:
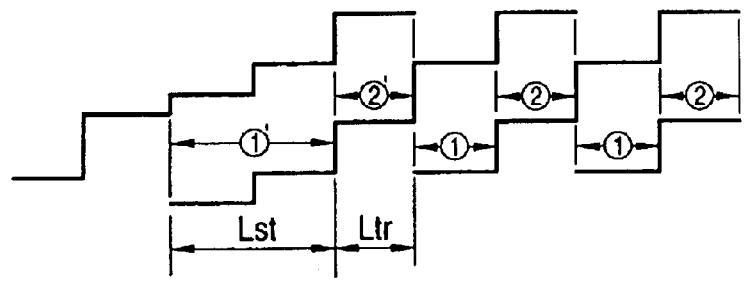
Figure 2C:
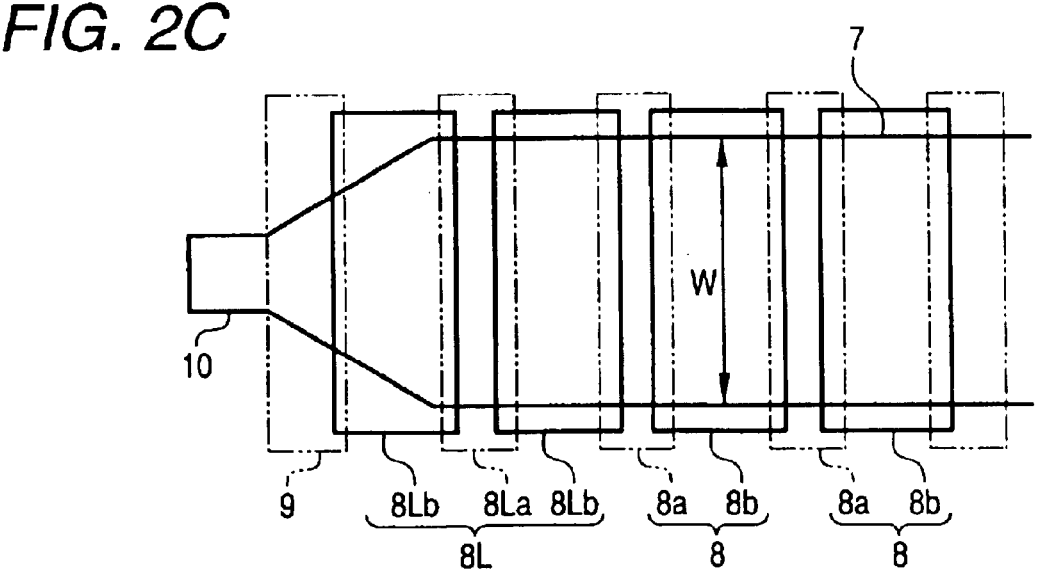

FIGS. 2A to 2C show the construction of the horizontal transfer register and the output portion of the CCD area sensor according to an embodiment of the present invention, wherein FIG. 2A is a cross-sectional view showing the arrangement of the electrodes of the horizontal transfer register, FIG. 2C is a potential distribution diagram corresponding to the electrode arrangement, and FIG. 2C is a plan view showing the construction of the last stage of the horizontal transfer register and its surrounding.

In FIG. 2, many two-layered transfer electrodes 8 formed of polysilicon or the like are arranged along the charge transfer direction X above the transfer channel, and a gate electrode 9 is formed so as to be adjacent to the last-stage transfer electrode 8L disposed at the last stage in the charge transfer direction X. Further an FD area 10 is connected to the last-stage transfer electrode 8L through the gate electrode 9. The channel width W of the transfer channel 7 is set to be gradually reduced from the last-stage transfer electrode 8L to the FD area 10 (i.e., this area is designed in a tapered structure).

When the horizontal transfer register is driven to perform the transfer operation, the two-phase driving pulses φH1, φh2 are applied to the two-layer transfer electrodes 8 (containing 8L), and also a gate voltage (DC voltage) VHOG is applied to the gate electrode 9, whereby the signal charge delivered from the vertical transfer register 2 is transferred in the horizontal direction X by the horizontal transfer register 4, and collected to the FD area through the gate electrode 9 due to the tapered structure of the transfer channel 7.

Here, each transfer electrode 8 except for the transfer electrode at the last stage is constructed by a transfer electrode 8a of a first layer and a transfer electrode 8b of a second layer. On the other hand, the last-stage transfer electrode 8L is constructed by a transfer electrode 8La of a first layer and two transfer electrodes 8Lb of a second layer, that is, three electrodes.

Further, the potential distributions of the transfer channel 7 below each transfer electrode 8 and the last-stage transfer electrode 8L are different from each other. That is, with respect to the area corresponding to each transfer electrode 8, impurities for shallowing the potential level are doped into the area below the transfer electrode 8 of the second layer, whereby the potential level corresponding to the transfer electrode 8a of the first layer is set to be deeper than the potential level corresponding to the transfer electrode 8b of the second layer.

On the other hand, with respect to the area corresponding to the last-stage transfer electrode 8L, impurities for shallowing the potential level are doped into an area below the transfer electrode 8Lb of the second layer which is located at the upstream side (right side in the figure) in the charge transfer direction X, and also impurities for deepening the potential level are doped into an area below the transfer electrode 8Lb of the second layer which is located at the downstream side (left side in the figure) opposite to the above side, whereby the transfer channel below the electrode is designed to have three-step potential. The three-step potential is set to be stepwise deeper from the upstream side to the downstream side in the charge transfer direction X.

Accordingly, in the channel area corresponding to each transfer electrode 8, the storage portion (1) is formed below the transfer electrode 8a of the first layer, and the transfer portion (2) is formed below the transfer electrode 8b of the second layer. On the other hand, in the channel area corresponding to the last-stage transfer electrode 8L, a storage portion (1)' which has a larger electrode length than the storage portion (1) below the transfer electrode 8a of the first layer and is different from the storage portion (1) by predetermined potential is formed below the transfer electrode 8La of the first layer and below the downstream-side transfer electrode 8Lb of the second layer. Further, a transfer portion (2)' which has the same electrode length Ltr as the transfer portion (2) below the transfer electrode 8b of the second layer is formed below the upstream-side transfer electrode 8Lb of the second layer.

Next, the manufacturing process of the horizontal transfer register according to this embodiment will be described with reference to FIGS. 3A to 3e.

Figure 3A:
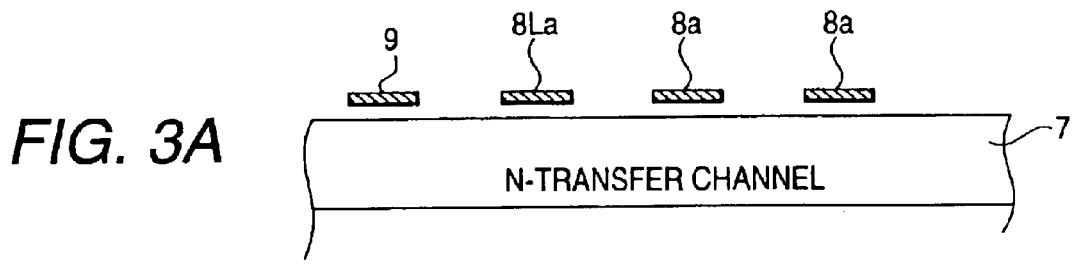
FIG. 3 is a diagram showing the manufacturing process of the horizontal transfer register according to the embodiment of the present invention.
Figure 3B:
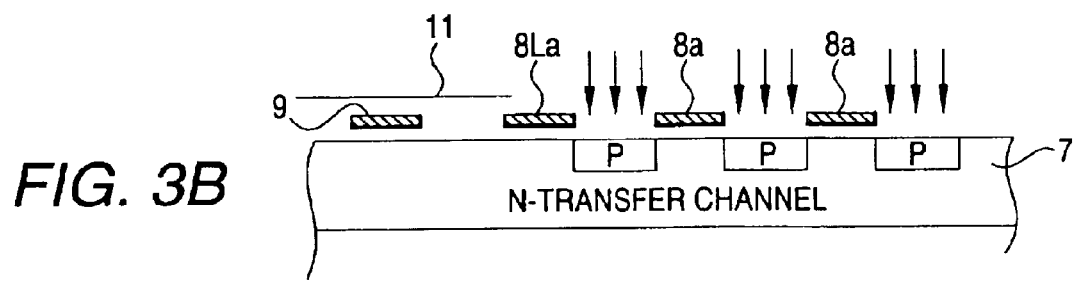
Figure 3C:
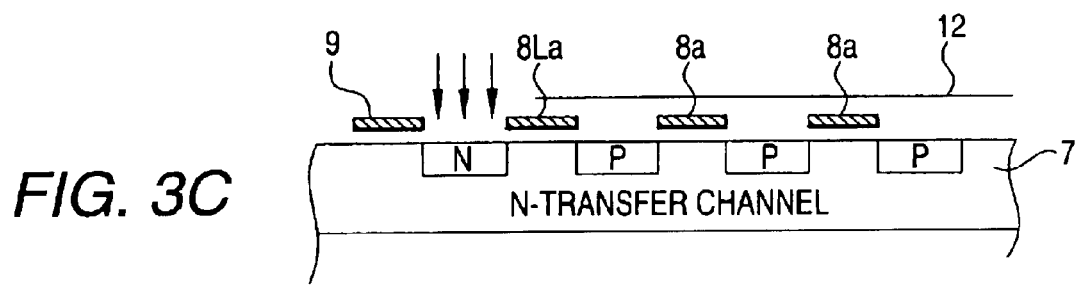

As shown in FIG. 3A, an N-type transfer channel is first formed on a semiconductor substrate, and then the electrodes 8a, 8La and 9 of the first layer are formed. Subsequently, as shown in FIG. 3B, a predetermined portion is covered by a resist mask 11 and then P-type impurities for shallowing the channel potential are doped by the ion implantation method or the like while the electrodes 8La, 8a of the first layers are used as a mask. Subsequently, as shown in FIG. 3C, the opposite side portion to the predetermined portion which was previously covered by the resist mask 11 is covered by a resist mask 12, and then N-type impurities for deepening the channel potential are doped by the ion implantation method or the like while the electrodes 8La, 9 of the first layer are used as a mask.

Figure 3D:
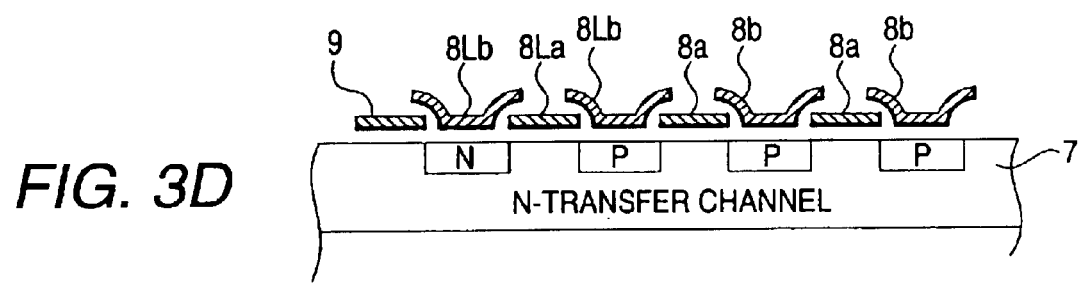
Figure 3E:
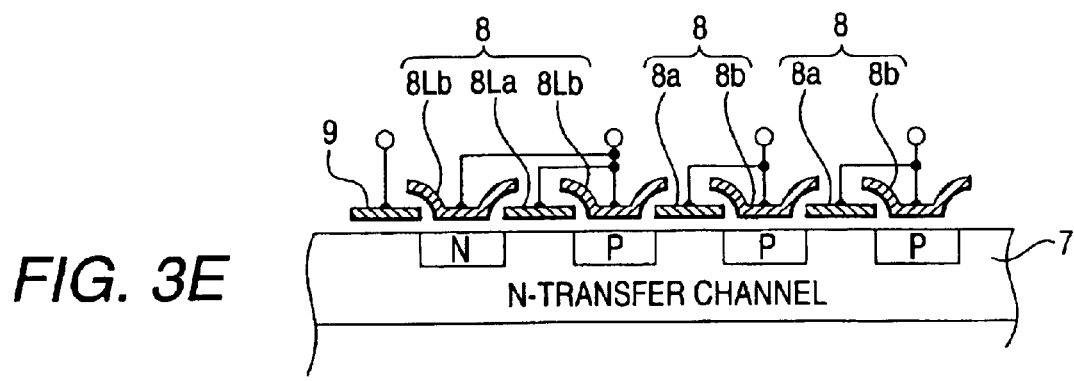

Subsequently, as shown in FIG. 3D, the electrodes 8a, 8La, 9 of the first layer are oxidized or the like to coat the peripheries of these electrodes with insulating material, and then the electrodes 8b, 8Lb of the second layer are formed. Finally, as shown in FIG. 3E, the electrode 9 of the first layer at the end portion is wired to form a gate electrode, and the other electrodes 8a, 8La of the first layer and the electrodes 8b, 8Lb of the second layer which are adjacent to each other are connected to each other to form electrically-integral transfer electrodes 8, 8L.

At this time, with respect to the last-stage transfer electrode 8L, the electrode 8La of the first layer and each of the two electrodes 8Lb of the second layer are connected to each other to connect the three electrodes to one another. Accordingly, the transfer electrode of the second layer is formed as the combination of the electrode 8a of the first layer and the electrode 8b of the second layer, and the last-stage transfer electrode 8L of the second layer is formed as the combination of the electrode 8La of the first layer and the two electrodes 8Lb of the second layer.

In the horizontal transfer register 4 thus obtained, the transfer channel below the last-stage transfer electrode 8L is constructed to have three-step potential, and the potential concerned is set to be deeper from the upstream side to the down stream side in the charge transfer direction. Therefore, even when the electrode length (Lst) of the storage portion (1) of the last-stage transfer electrode 8L is increased, the signal charge can flow more easily due to the increase of the number of the potential steps at the last stage. Accordingly, only the storage charge amount can be increased without reducing the charge transfer efficiency at the last-stage transfer electrode 7L.

Figure 4A:
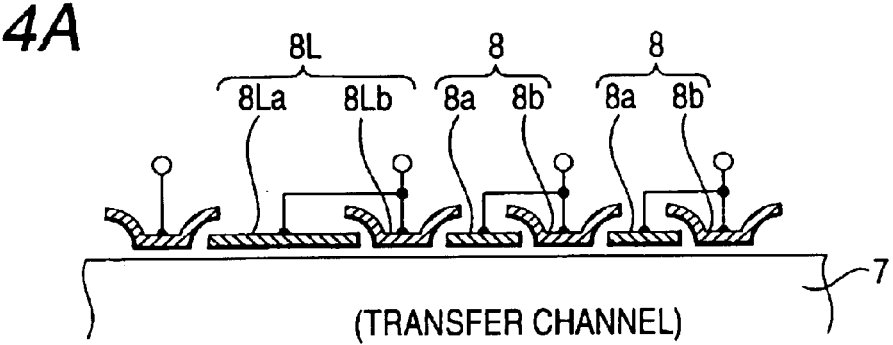
FIG. 4 is a diagram showing another embodiment of the present invention.
Figure 4B:
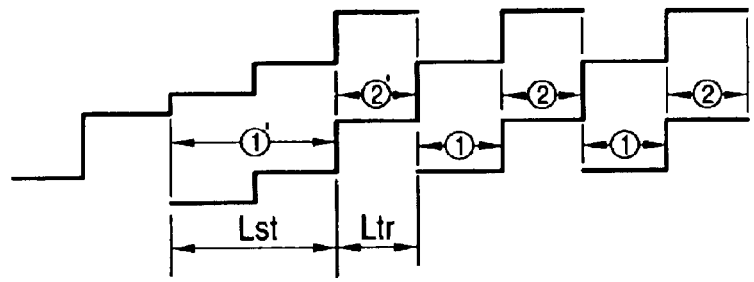
Figure 4C:
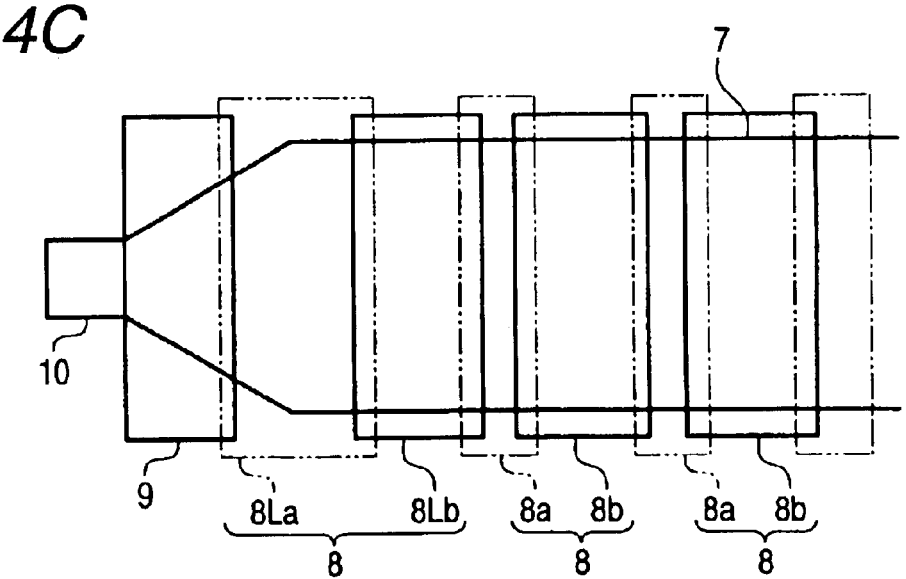
Figure 5A:
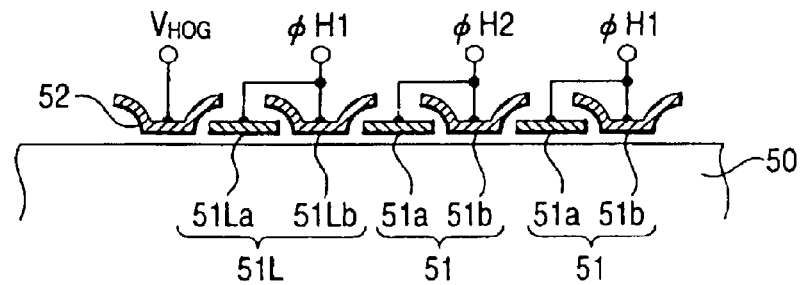
FIG. 5 is a diagram showing the main part of a conventional horizontal transfer register.
Figure 5B:
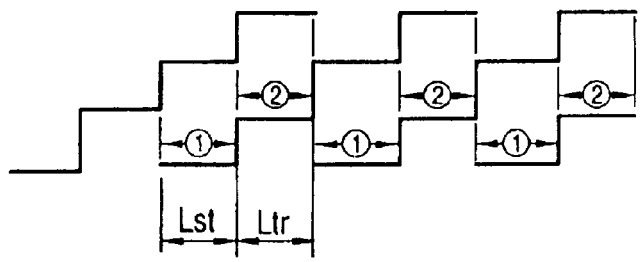
Figure 5C:
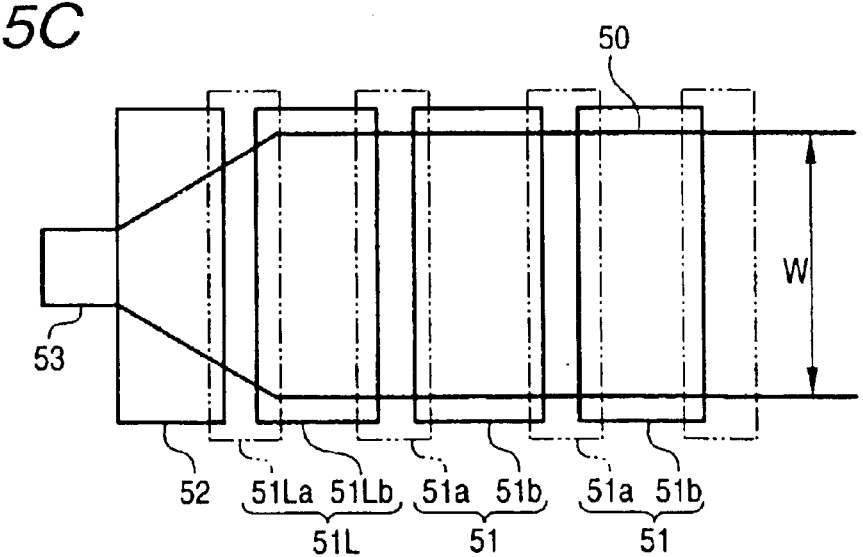
Figure 6A:
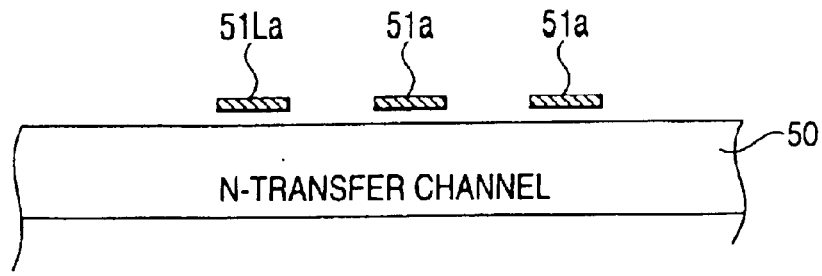
FIG. 6 is a diagram showing the manufacturing process of the conventional horizontal transfer register.
Figure 6B:
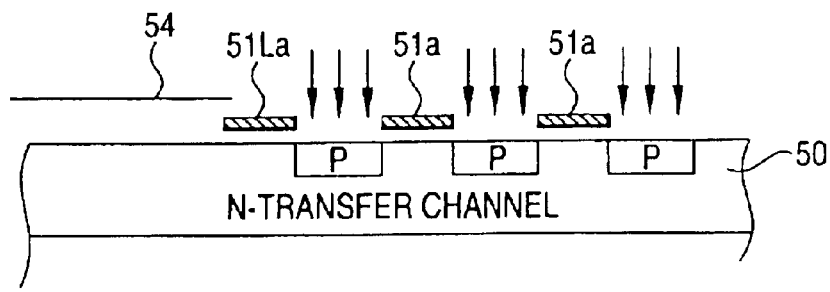
Figure 6C:
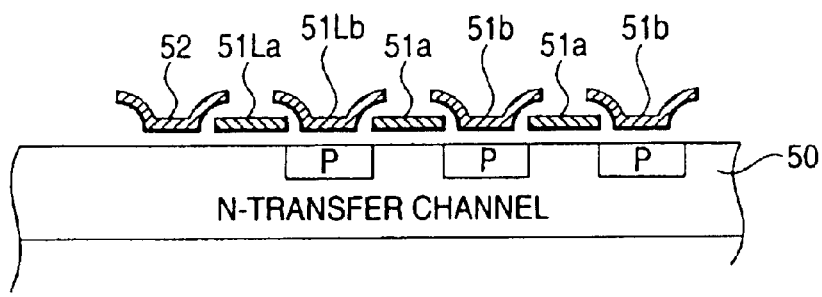
Figure 6D:
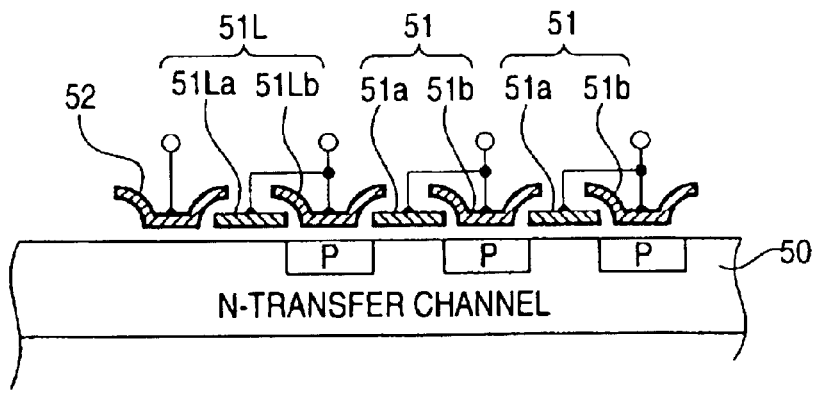
Figure 7:
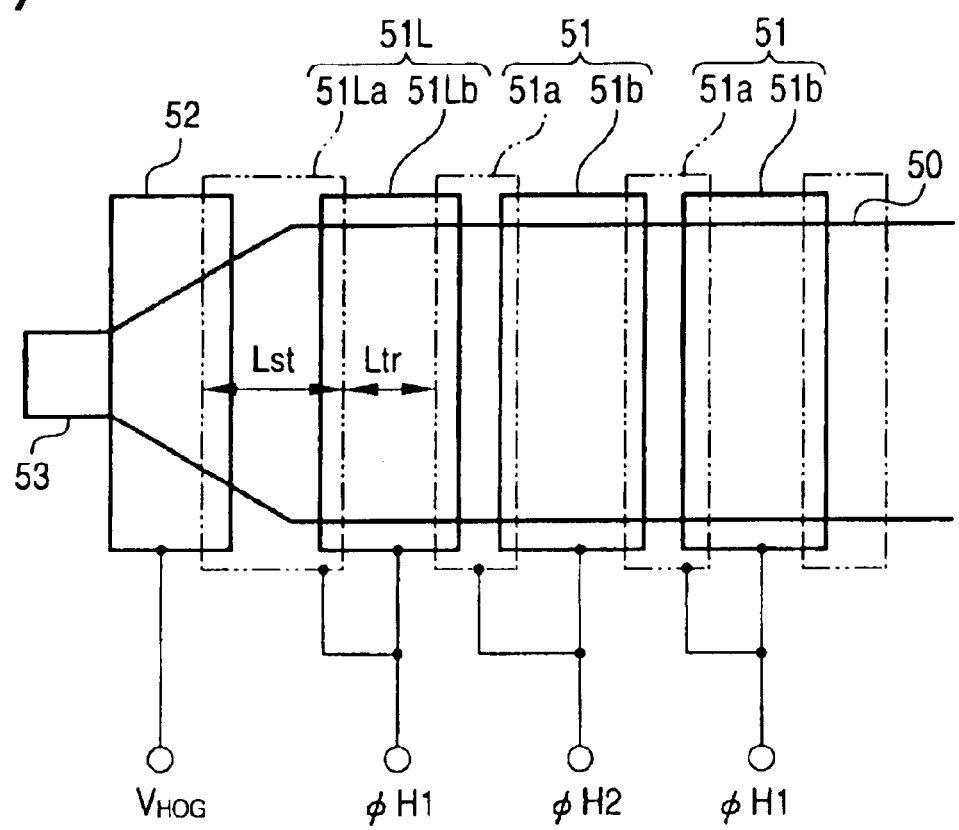
FIG. 7 is a diagram showing problems of the prior art.

In the above embodiment, the last-stage transfer electrode 8L is constructed by three electrodes (the transfer electrode 8La of the first layer and the two transfer electrodes 8Lb of the second layer). However, as another way, the last-stage transfer electrode 8L may be constructed by two electrodes of the transfer electrode 8La of the first layer and the transfer electrode 8Lb of the second layer as shown in FIG. 4 and the potential difference may be formed below the transfer electrode 8La of the first layer, whereby the transfer channel below the last-stage transfer electrode 8L is constructed to have three-step potential.

The potential level of the transfer channel 7 below the transfer electrodes 8,8L of the second layer may be set to any level in accordance with the concentration of the impurities, the doping amount, etc. based on the ion implantation method or the like. Further, the transfer channel 7 below the last-stage transfer electrode 8L may be constructed to have potential of three or more steps.

Further, in the above embodiment, the charge transfer device according to the present invention is applied to the horizontal transfer register of the CCD area sensor. However, the present invention may be applied to a transfer register of a CCD linear sensor.

As described above, according to the charge transfer device and the solid-state image pickup device of the present invention, the transfer channel below the last-stage transfer electrode is constructed to have potential of three or more steps, and the potential is set to be stepwise deeper from the upstream side to the downstream side in the charge transfer direction, whereby even when the electrode length of the storage portion of the last-stage transfer electrode is increased, only the storage charge amount can be increased without reducing the charge transfer efficiency. Accordingly, in the charge transfer register such as CCD sensor or the like, the operating charge amount can be increased without deteriorating the transfer efficiency.

What is claimed is:

1. A charge transfer device comprising:
   a transfer channel; and
   plural pairs of two-layered transfer electrodes arranged along a transfer direction of the transfer channel, wherein two-phase driving pulses are applied to the plural pairs of two-layered transfer electrodes, and the transfer channel below a paired two-layered transfer electrode disposed at the last portion in the transfer direction has a first area, a second area which is provided downstream of the first area in the transfer direction and has a deeper potential level than the first area, and a third area which is provided downstream of the second area in the transfer direction and has a deeper potential level than the second area; and wherein the first area, the second area, and the third area are each located beneath a final group of two-layered transfer electrodes, and there is less transfer channel area beneath the final group of two-layered transfer electrodes than located beneath the other groups of two-layered transfer electrodes.

2. The charge transfer device as claimed in claim 1, further comprising transfer electrodes which are independently provided directly above the first area, the second area and the third area.

3. The charge transfer device as claimed in claim 2, wherein common driving pulses are applied to the independently-provided transfer electrodes.

4. The charge transfer device as claimed in claim 1, wherein commonly provided transfer electrodes are provided above the second area and the third area.

5. The charge transfer device as claimed in claim 4, wherein common driving pulses are applied to the transfer electrodes provided above the first area and the commonly provided transfer electrode.

6. The charge transfer device as claimed in claim 1, wherein the transfer channel has at the last portion in the transfer direction an area which is gradually tapered at the downstream side, and at least the third area is disposed so as to overlap the gradually-tapered area.

7. A solid-state image pickup device comprising:

an image pickup portion which contains plural photosensors and converts input light to electrical signals by the plural photosensors;

a transfer channel for transferring the charges photoelectrically converted in the image pickup portion; and plural pairs of two-layered transfer electrodes arranged along a transfer direction of the transfer channel, wherein two-phase driving pulses are applied to the plural pairs of two-layered transfer electrodes, and the transfer channel below a paired two-layered transfer electrode disposed at the last portion in the transfer direction has a first area, a second area which is provided downstream of the first area in the transfer direction and has a deeper potential level than the first area, and a third area which is provided downstream of the second area in the transfer direction and has a deeper potential level than the second area; and wherein the first area, the second area, and the third area are each located beneath a final group of two-layered transfer electrodes, and there is less transfer channel area beneath the final group of two-layered transfer electrodes than located beneath the other groups of two-layered transfer electrodes.

* * * * *